C. O. BREESE.
ROUND RIM BOUND TOP FOR TABLES.
APPLICATION FILED APR. 16, 1920.
1,396,554.
Patented Nov. 8, 1921.
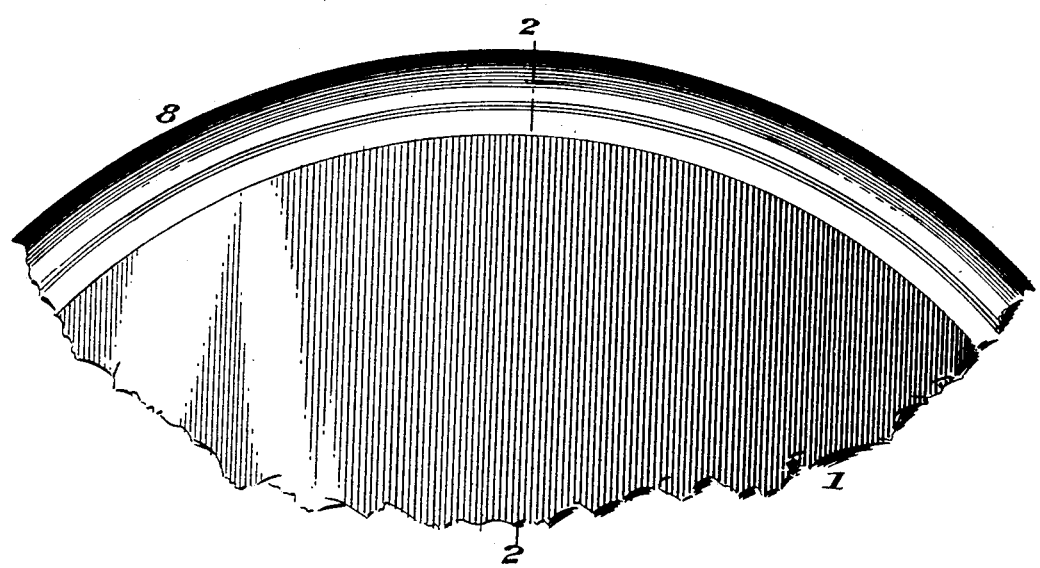
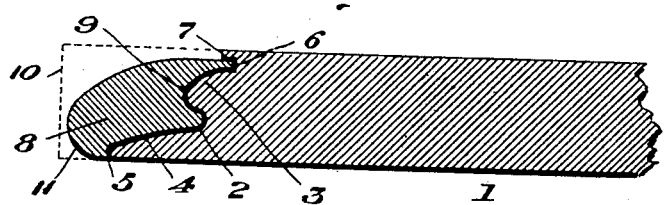

UNITED STATES PATENT OFFICE.

CHARLES O. BREESE, OF PORTSMOUTH, OHIO.

ROUND RIM-BOUND TOP FOR TABLES.

1,396,554. Specification of Letters Patent. Patented Nov. 8, 1921.

Application filed April 16, 1920. Serial No. 374,351.

*To all whom it may concern:*

Be it known that I, CHARLES O. BREESE, a citizen of the United States, residing at Portsmouth, in the county of Scioto and State of Ohio, have invented certain new and useful Improvements in Round Rim-Bound Tops for Tables, of which the following is a specification.

My invention relates to an improvement in round rim bound tops for tables, and the object is to provide a solid or veneered top of cheaper and stronger construction than heretofore; and this invention consists in a core which may either be solid or veneered, with its rounded edge molded into the form or contour desired, in connection with a bent rim correspondingly molded on its inner edge to interlock with, and adapted to be made to adhere to, the edge of the core, after which its outer surface may be left as originally formed or fashioned into any desired shape, to suit taste and requirements.

In the accompanying drawings:—

Figure 1 is a plan view of a fragment of a rim bound table top;

Fig. 2 is a section on line 2—2 of Fig. 1.

The numeral 1 represents the core, which may be made of one solid piece, or which might have one or two layers of veneer (not shown) at the top.

The rounded edge is molded somewhat as illustrated in Fig. 2, in a general diagonal direction running straight across and in more or less circumferential flutings or corrugations 2 and 3, with an extended outer surface 4 which terminates preferably in an abrupt outer periphery 5 at one end, and at the other in an angular circumferential groove 6 and a shoulder 7. This shoulder 7 and the periphery 5 preferably extend approximately at right-angles to the adjacent outer surfaces of the top.

In this way, the molded edge is given an expanse of area as well as a corrugated contour that interlocks with the molded inner edge of the rim of bent wood 8, whose inner edge conforms precisely to and fits the outer-molded edge of the core, as shown clearly in Fig. 2. A layer of glue or adhesive material 9 is interposed between the two, whereby to make a solid union of core and rim.

After being thus formed, the table top may be used with a square outer edge, as indicated by dotted lines in Fig. 1, which is its original form, or it may be put in a lathe and turned down into any shape, for instance that illustrated in the full lines 11, and when thus fashioned leaving the shoulder 7 exposed as a part of the finished edge of the table top.

In this way, no end wood or fiber of the core is left exposed, and the rim being made of bent wood, no end fiber of that is exposed, except at the very ends of the straight center of the table top, where it gets no wear, and is never exposed to view. In this way, I have provided a simple and comparatively inexpensive solid or veneered top of relatively cheap construction, easily manufactured, and with a solid and permanent joint formed between core and rim.

Obviously the contour of the molded edges might be varied, the essential feature being an edge with a maximum expanse of interlocking surface to receive the glue which causes the core and rim to tightly adhere, as if composed of a single solid part.

I claim:

A rim bound top including a core, the curved edge of which is molded into the form of a diagonally-disposed circumferential fluting or corrugation, with the extreme ends extending approximately at right-angles to the adjacent surface of the core and having a circumferential groove adjacent to one of said ends, and a rim molded on its inner periphery to correspond with and fit the molded outer edge of the core, said rim adapted to be fashioned from the point where it joins the outer surface of the core into the external shape desired, thus leaving the upper transversely-extending edge of the core finally exposed as a part of the permanent outer edge of a portion of the top.

In testimony whereof I affix my signature.

CHARLES O. BREESE.